(12) United States Patent
Vulugundam

(10) Patent No.: US 8,719,811 B2
(45) Date of Patent: May 6, 2014

(54) METHOD OF CAUSING FUNCTIONS TO BE EXECUTED ON BUSINESS OFFICE APPLIANCES

(75) Inventor: Revathi Vulugundam, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 800 days.

(21) Appl. No.: 12/495,681

(22) Filed: Jun. 30, 2009

(65) Prior Publication Data

US 2010/0085597 A1    Apr. 8, 2010

Related U.S. Application Data

(63) Continuation-in-part of application No. 12/247,176, filed on Oct. 7, 2008, now Pat. No. 8,527,614.

(51) Int. Cl.
*G06F 9/44* (2006.01)

(52) U.S. Cl.
USPC .............................. 717/173; 726/11

(58) Field of Classification Search
None
See application file for complete search history.

(56) References Cited

U.S. PATENT DOCUMENTS

| | | | |
|---|---|---|---|
| 6,814,510 B1 * | 11/2004 | Sabbagh et al. | 400/63 |
| 6,915,342 B1 | 7/2005 | Motoyama | |
| 7,631,350 B2 * | 12/2009 | Parry | 726/11 |
| 2001/0028465 A1 | 10/2001 | Sugino | |
| 2002/0087961 A1 * | 7/2002 | Dorricott | 717/168 |
| 2002/0199173 A1 | 12/2002 | Bowen | |
| 2003/0122871 A1 | 7/2003 | Darlet et al. | |
| 2003/0177421 A1 | 9/2003 | Baker et al. | |
| 2003/0221186 A1 | 11/2003 | Bates et al. | |
| 2004/0049552 A1 | 3/2004 | Motoyama et al. | |
| 2004/0093598 A1 | 5/2004 | Haga et al. | |
| 2004/0184467 A1 * | 9/2004 | Watanabe | 370/401 |
| 2004/0215706 A1 * | 10/2004 | Lavender et al. | 709/201 |

(Continued)

FOREIGN PATENT DOCUMENTS

| | | |
|---|---|---|
| JP | H 06-222956 | 8/1994 |
| JP | H 09-325927 | 12/1997 |

(Continued)

OTHER PUBLICATIONS

Stallman et al., "Debugging with GDB", downloaded from the internet archive at URL, http://wweb.archive.org/web/20060510224136:///www.gnuarm.com/pdf/gdb.pdf>, dated May 10, 2006, 5 pages.

(Continued)

*Primary Examiner* — Elias Mamo
(74) *Attorney, Agent, or Firm* — Hickman Palermo Truong Becker Bingham Wong LLP

(57) ABSTRACT

Status information of one or more business office appliances operating behind a firewall are retrieved remotely by a service management application. The service management application transmits, via electronic mail from a first network behind a first firewall to a second network behind a second firewall, information that identifies the one or more business office appliances. A device management application at the second network receives the information and, based on the information, communicates instructions to one or more business office appliances. The instructions are executed on the one or more business office appliances without requiring re-boot of the business office appliances. Results of executing the instructions are used to generate a response document that is sent back to the service management application and/or to a database on the first network.

23 Claims, 10 Drawing Sheets

(56) References Cited

U.S. PATENT DOCUMENTS

| | | |
|---|---|---|
| 2005/0132349 A1 | 6/2005 | Roberts et al. |
| 2005/0216895 A1 | 9/2005 | Tran |
| 2005/0257214 A1 | 11/2005 | Moshir et al. |
| 2005/0275867 A1 | 12/2005 | Higashiura et al. |
| 2006/0026434 A1 | 2/2006 | Yoshida et al. |
| 2006/0078346 A1 | 4/2006 | Lovat et al. |
| 2007/0162460 A1 | 7/2007 | Long |
| 2008/0005733 A1* | 1/2008 | Ramachandran et al. .... 717/168 |
| 2008/0085741 A1* | 4/2008 | Tauberman et al. .......... 455/567 |
| 2008/0127115 A1 | 5/2008 | Bystricky et al. |
| 2009/0066995 A1 | 3/2009 | Mukund et al. |
| 2009/0119681 A1 | 5/2009 | Bhogal et al. |
| 2009/0316175 A1 | 12/2009 | Wang |
| 2010/0088693 A1 | 4/2010 | Vulugundam |
| 2010/0220358 A1* | 9/2010 | Beninato et al. ............ 358/1.15 |

FOREIGN PATENT DOCUMENTS

| | | |
|---|---|---|
| JP | 2002251263 | 9/2002 |
| JP | 2002259312 | 9/2002 |
| JP | 2003084982 A | 3/2003 |
| JP | 2003233512 A | 8/2003 |
| JP | 2003-276284 A | 9/2003 |
| JP | 2003296132 A | 10/2003 |
| JP | 2004194284 A | 7/2004 |
| JP | 2008062582 A | 3/2008 |

OTHER PUBLICATIONS

U.S. Appl. No. 12/247,176, filed Oct. 7, 2008, Office Action, Oct. 6, 2011.

U.S. Appl. No. 12/247,176, filed Oct. 7, 2008, Final Office Action, Feb. 27, 2012.

* cited by examiner

METHOD OF CAUSING FUNCTIONS TO BE EXECUTED ON BUSINESS OFFICE APPLIANCES

RELATED APPLICATIONS

The present application is related to and claims benefit as a Continuation-in-part of U.S. patent application Ser. No. 12/247,176, entitled "A Method of Deployment of Remote Patches to Business Office Appliances," filed by Revathi Vulugundam on Oct. 7, 2008, now U.S. Pat. No. 8,527,614 the entire contents of which are incorporated herein by reference for all purposes.

The present application is also related to U.S. patent application Ser. No. 12/141,705 entitled "Approach for Updating Usage Information on Printing Devices," filed by Sam Wang on Jun. 18, 2008, the entire contents of which are incorporated herein by reference for all purposes.

FIELD OF THE INVENTION

This invention relates generally to the copying, printing, scanning and facsimile transmission of documents. In particular, this invention relates to retrieving the status of a business office appliance such as a multi-function peripheral.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The use of business office appliances has proliferated as offices have become more automated and less dependent on manual devices. The term "business office appliance" as used herein may refer broadly to any device configured to create electronic or paper documents, including providing one or more of the following functions: copying, printing, scanning, and facsimile transmission. One embodiment of a business office appliance is a multi-function peripheral (MFP) device. As an increasing number of businesses expand into new markets while becoming more decentralized, the number of business office appliances deployed has similarly increased. Many business office appliances operate as network devices, often behind a firewall.

In addition to the obvious security advantages obtained through operating a business office appliance behind a firewall, there are some disadvantages. Retrieval of the current status of the business office appliance requires a visit by a technician. Such visits create both a service disruption and increased operation costs such as downtime that ultimately are borne by users.

Based on the foregoing, there is a need for an approach of retrieving the status of one or more business office appliances operating behind a firewall.

SUMMARY

Current status information of one or more business office appliances is retrieved remotely by a service management application from a device management application. The service management application transmits, via a firewall friendly protocol from a first network behind a first firewall, information that identifies the one or more business office appliances. This information is retrieved by a proxy server located behind a second firewall and forwarded to the device management application. The device management application receives the information that identifies the one or more business office appliances, and the device management application uses the information to create instructions for retrieving the status of the one or more business office appliances. The device management application communicates the instructions to one or more business office appliances for execution. Each business office appliance executes the instructions concurrently with its normal operating processes. One result of execution of the instructions causes a status of the business office appliance to be returned to the device management application. The device management application may then communicate the status back to the service management application via a firewall friendly protocol.

BRIEF DESCRIPTION OF THE DRAWINGS

In the figures of the accompanying drawings, like reference numerals refer to similar elements.

DETAILED DESCRIPTION

A. Overview

Current status information of one or more business office appliances is retrieved remotely by a service management application from a device management application. The service management application transmits, via a firewall friendly protocol from a first network behind a first firewall, information that identifies the one or more business office appliances. This information is retrieved by a proxy server located behind a second firewall and forwarded to the device management application. The device management application receives the information that identifies the one or more business office appliances and uses the information to create instructions for retrieving the status of the one or more business office appliances. The device management application communicates the instructions to one or more business office appliances for execution. Each business office appliance executes the instructions concurrently with its normal operating processes. One result of execution of the instructions causes a status of the business office appliance to be returned to the device management application. The device management application may then communicate the status back to the service management application via a firewall friendly protocol.

An embodiment of the invention comprises: a service management application generating a status request document and causing the status request document to be transmitted over a first network behind a first firewall and stored on a server to allow a proxy server to retrieve the status request document from the server via a firewall friendly protocol and translating the status request document, if necessary, by a device commands communicator; and transmitting the status request document to a device management application via a second network behind a second firewall, wherein the second network is different than the first network.

B. Configuration of the Service Management System

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
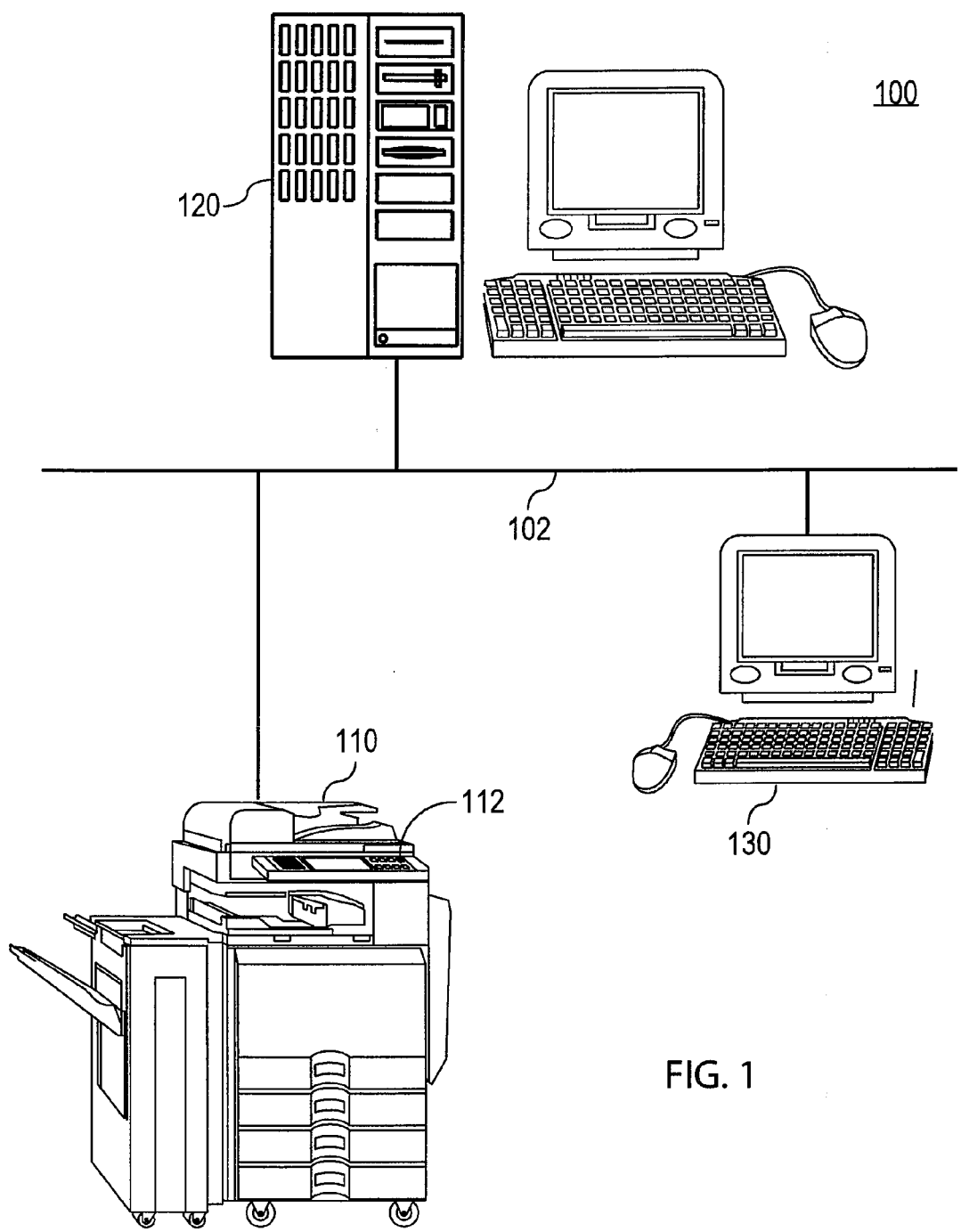
FIG. 1 is a block diagram of a multi-function peripheral connected to a network.

FIG. 1 depicts system 100 in which a business office appliance (in this instance, an MFP 110) is connected to a network 102 to which an administrative computer 120 and a user computer 130 are connected. MFP 110 typically provides functions for copying, printing, scanning and facsimile transmission of documents. User access to MFP 110 is provided by a user interface 112 on MFP 110. In an embodiment, user access to MFP 110 is provided by user computer 130. Network 102 is internal and optionally separated from external networks by a firewall (not shown). Access to internal data, such as MFP status, software, and log files, residing on MFP 110 may be obtained through MFP 110, and optionally through administrative computer 120 or user computer 130. Instructions to access data from MFP 110 may be executed over network 102, but the MFP cannot be directly accessed by other networks through the firewall.

Figure 2:
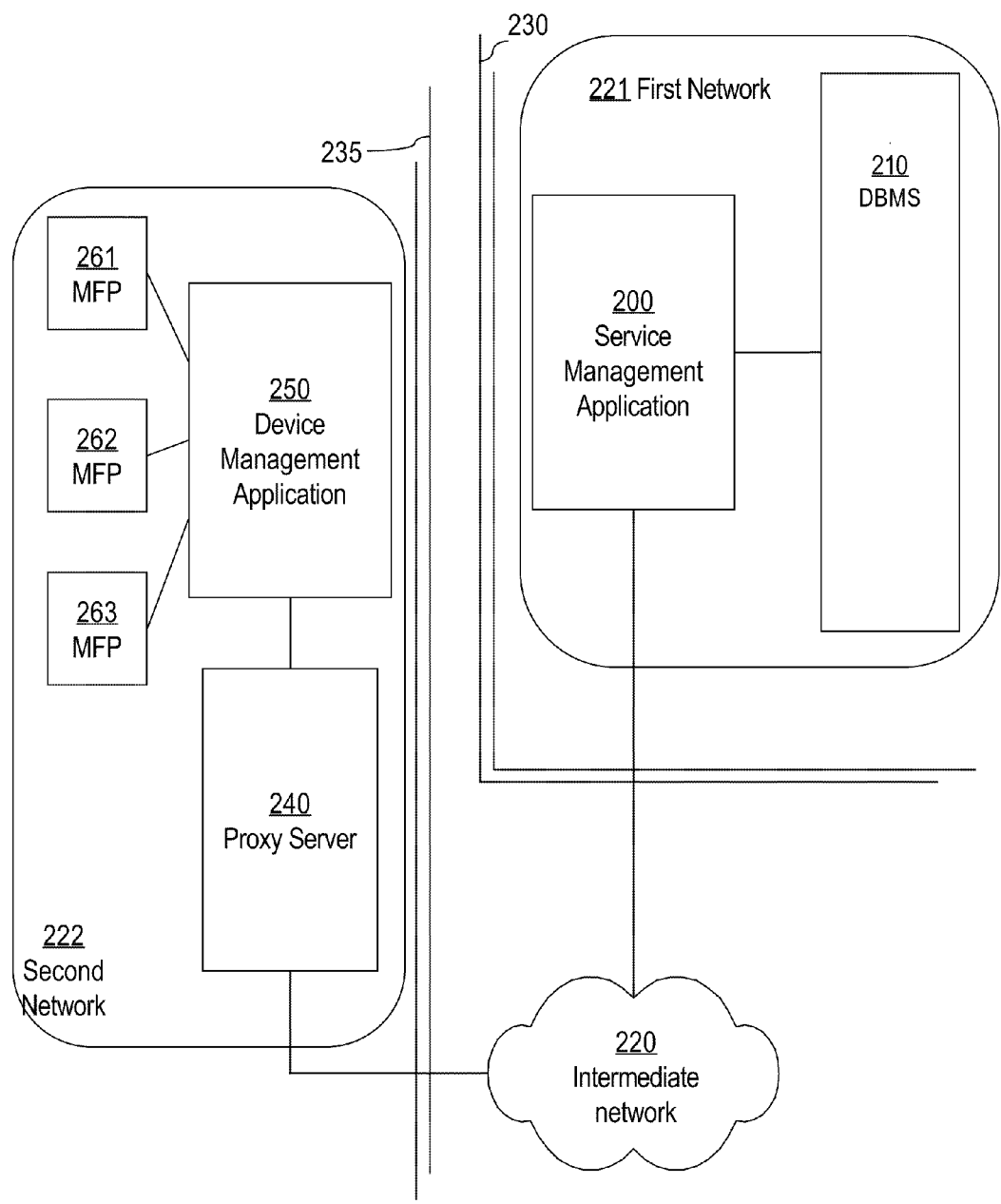
FIG. 2 is a block diagram of the hardware and software components of the service management system connected to a network and passing through one or more firewalls.

FIG. 2 is block diagram of example hardware and software components of a service management system connected to a network and configured to transmit request documents and/or software patches to a proxy server through one or more firewalls. A service management application 200 is connected to a database management system (DBMS) 210 on a first network 221 behind a first firewall 230. Service management application 200 operates on a networked computer (not shown) connected to the first network, for example, a personal computer. DBMS 210 may be implemented using any type of database management system including, for example, a relational database. In an embodiment, DBMS 210 is implemented using MySQL 5.0. Networks 221 and 222 are conventional wired or wireless networks that are either connection-less or uses connection-based sockets. In an embodiment, networks 221 and 222 are Ethernet wide-area networks using Internet standard protocol.

First firewall 230 limits data transfer between intermediate network 220 and first network 221, which includes service management application 200 and DBMS 210. Second firewall 235 limits data transfer between intermediate network 220 and second network 222, which includes proxy server 240 and device management application 250. Firewalls 230 and 235 may be implemented in hardware, software, or any combination thereof. Firewalls 230 and 235 may perform packet filtering or may operate as an application layer firewall. However, firewall 235 permits retrieval by proxy server 240 of messages located on intermediate network 220, first network 221, or second network 222. For example, retrieval may be performed using Post Office Protocol version 3 (POP3), Internet Message Access Protocol version 4 (IMAP4), Simple Object Access Protocol (SOAP), Hypertext Transfer Protocol (http), or File Transfer Protocol (ftp). Although several embodiments of the invention are described herein in the context of electronic mail messages, the invention is not limited to this context and is applicable to any type of electronic messages, such as messages transmitted using instant messaging.

Proxy server 240 is connected to a device management application 250. As described below with reference to FIG. 6, an embodiment of device management application 250 comprises a converter interface 610 and a device commands communicator 620. Device management application 250 receives electronic mail messages originating at service management application 200 that travel from first network 221 to second network 222 and are retrieved by proxy server 240. Use of proxy server 240 permits communications by the service management system through firewalls 230 and/or 235, while retaining the desirable features of firewalls 230 and/or 235 that are useful in a business environment, and without modifying firewalls 230 and/or 235. In one embodiment, electronic mail messages retrieved by proxy server 240 are addressed to device management application 250.

Connected to device management application 250 are one or more business office appliances; FIG. 2 depicts MFP 261, MFP 262, and MFP 263, although in operation any number of business office appliances may be connected to device management application 250. From an administrator's perspective, MFP 261, 262 and 263 comprise a particular 'remote system' of business office appliances controlled by device management application 250; for example, the remote system depicted in FIG. 2 might be located at a particular corporate site.

While not depicted in FIG. 2, service management application 200 and first network 221 may be configured to communicate to a multiplicity of proxy servers through a multiplicity of firewalls, thus permitting a single service management application 200 to service an essentially unlimited number of business office appliances connected to any number of separate networks.

Figure 6:
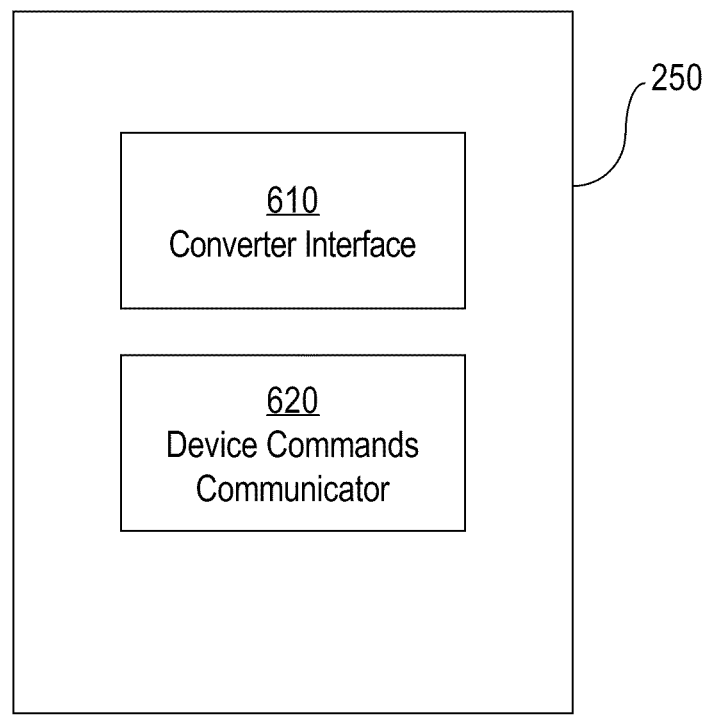
FIG. 6 is a block diagram is a block diagram that depicts a device management application.

Illustrated in FIG. 6 are example components of device management application 250. Converter interface 610 is configured to convert, if necessary, information sent in electronic mail messages from service management application 200 into device commands such as status update commands that are then executed by device commands communicator 620 on one or more of MFP 261, 262, and 263. Converter interface 610 is further configured to convert, if necessary, software patch information in the electronic mail messages into software patches that are then installed on one or more of MFP 261, 262, and 263 by device commands communicator 620. Device commands communicator 620 is further configured to receive device status and log files from one or more of MFP 261, 262, and 263 and forward the device status and log files to converter interface 610 for conversion, if necessary, into electronic mail messages for transmission back to service management application 200 via proxy server 240. In one embodiment, device commands communicator 620 is configured to detect a change in status of one or more office appliances and forward the device status to converter interface 610 for conversion into electronic mail messages for transmission back to service management application 200. Both service management application 200 and proxy server 240 are further described below with reference to FIGS. 3 and 4.

C. Initialization of the Service Management Application

Figure 3:
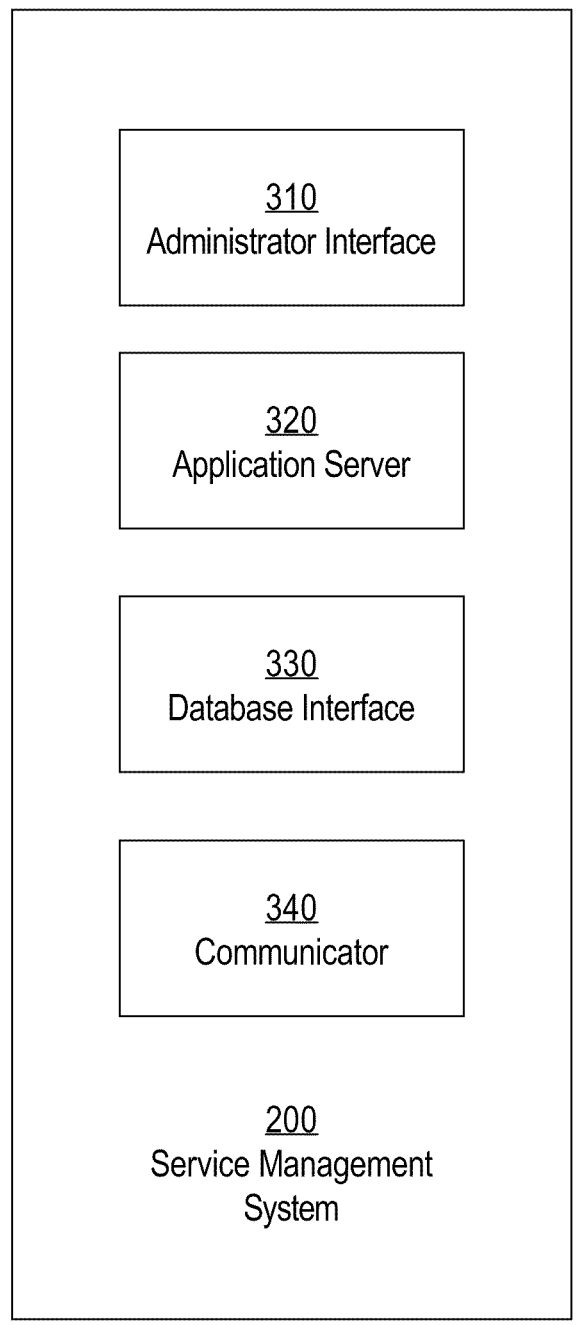
FIG. 3 is a block diagram that depicts a service management application.

FIG. 3 depicts an embodiment of service management application 200 having an administrator interface 310, an application server 320, a database interface 330, and a communicator 340. In actual use, service management application 200 need not comprise separate components corresponding to administrator interface 310, application server 320, database interface 330, and communicator 340; the particular embodiment depicted here is presented to illustrate the various functions that service management application 200 may perform.

Figure 4:
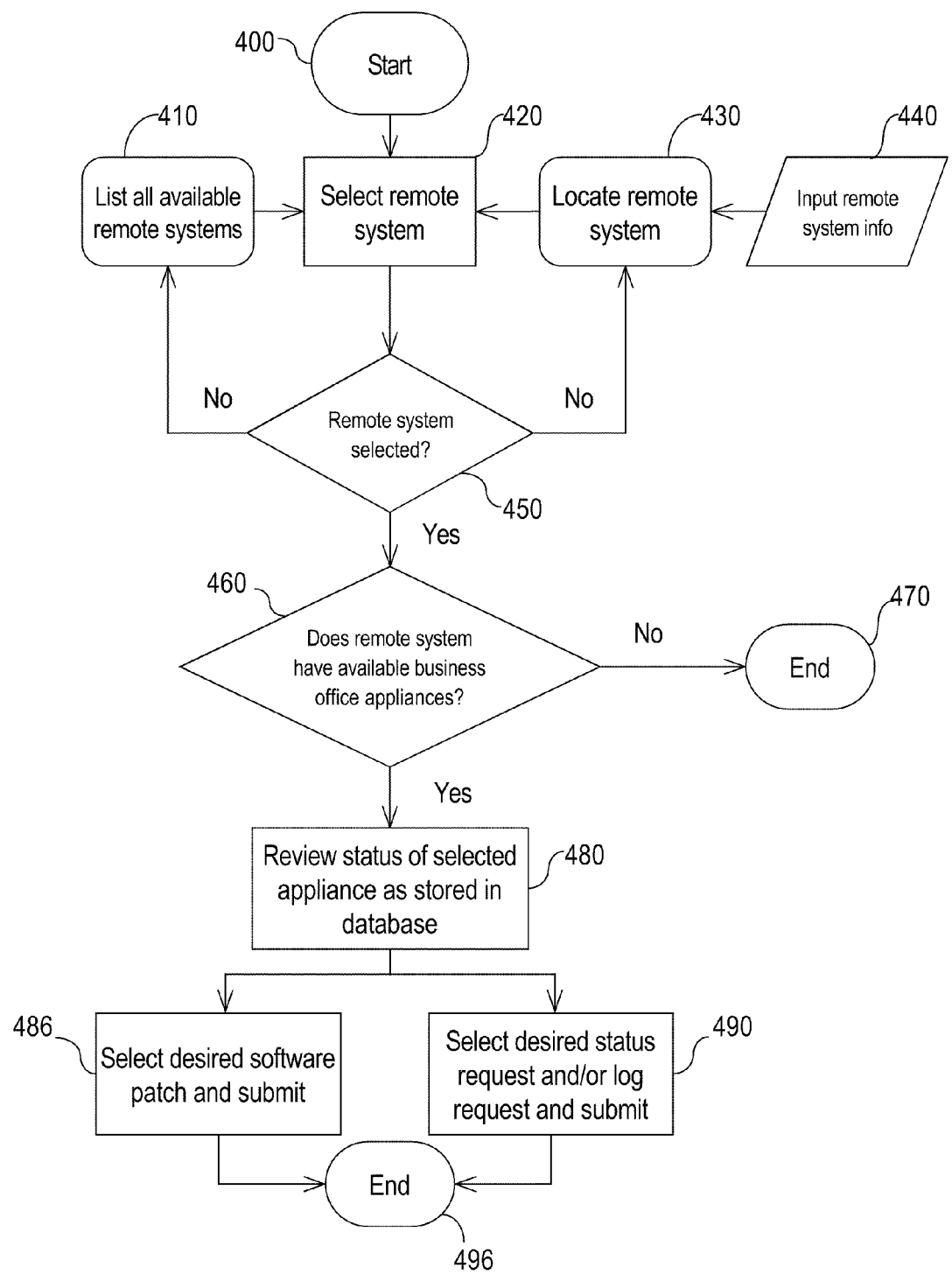
FIG. 4 is a flow diagram that depicts an approach for review, retrieval, and modification of software patch information, status information, and/or log information.

The elements depicted in FIGS. 2-3 are described below first with respect to functions performed as part of the initialization process used to acquaint service management application 200 with MFPs 261-263 on the other side of firewall 235. These functions are represented in FIG. 4 at step 440.

In an embodiment, overall coordination of the functions of service management application 200 is provided by application server 320. In an embodiment, application server 320 is a Java Platform, Enterprise Edition (Java EE or J2EE) Application Server. In an embodiment, administrator interface 310, database interface 330 and communicator 340 comprise applications dependent on application server 320.

Administrator interface 310 provides an interface from which to remotely review the status of one or more of MFP 261, 262, and 263 as stored in database interface 330, select appropriate software patches for transmission to one or more of MFP 261, 262, and 263, retrieve updated status information, and/or review log files from one or more of MFP 261, 262, and 263.

In an embodiment, administrator interface 310 is presented as an Internet Explorer webpage operating in Windows operating environment and written as JAVA servlets using JavaServer Pages (JSPs). Upon initial activation of administrator interface 310 by an administrator, the administrator is presented with one or more input screens used to input information regarding user name, password, host IP address and port of DBMS 210.

In an embodiment, administrator interface 310 then prompts the administrator to input incoming mail server information, such as user name, password, host IP address and port. Similarly, the administrator is prompted for outgoing mail server information, such as host IP address and port. This information is used to establish connections among service management application 200, DBMS 210, and first network 221.

In an embodiment, administrator interface 310 then prompts the administrator to input one electronic mail address for each proxy server 240 connected both to a particular device management application 250 (or remote system) that manages a set of one or more MFPs and service management application 200. As previously explained, service management application 200 can be connected remotely to a plurality of device management applications each configured on a separate network.

Information input by the administrator regarding one or more MFPs managed by a particular device management application is used to initialize entries for the MFPs in DBMS 210 through database interface 330. Database interface 330 provides an interface, if necessary, for translation of administrator data input and commands into a format understandable by DBMS 210 and similarly translates, if necessary, data received from DBMS 210 either for review by the administrator or for control of or installation on an MFP.

While FIG. 2 depicts service management application 200 being separate from DBMS 210 and connected to DBMS 210 via a connection such as, but not limited to: Ethernet, Wi-Fi, and Bluetooth, DBMS 210 may also reside on the computer on which service management application 200 resides.

With reference to FIG. 2, after the administrator initializes entries for MFP 261, MFP 262 and MFP 263 in DBMS 210, DBMS 210 may still use initial status information from MFP 261, MFP 262, and MFP 263 to provide a "baseline" set of information when reviewing the status of devices. In an embodiment, the administrator inputs initial status information. In another embodiment, the initial status information for a particular device is communicated to the second network when the particular device is installed on the second network.

In an embodiment, such initial status information from MFP 261, MFP 262, and MFP 263 is obtained automatically by DBMS 210 when DBMS 210 transmits initialization instructions to database interface 330. These instructions are then prepared by communicator 340 for transmission via electronic mail, for example, from intermediate network 220 to proxy server 240. Initialization instructions, and other instructions used to access or control an MFP, are described later below with reference to FIG. 4.

In an embodiment, communicator 340 formats initialization instructions as a file that is appended to an electronic mail message addressed to device management application 250 and containing one or more MFP destination identifiers, such as one corresponding to MFP 261. Electronic mail communications are managed by application server 320.

D. Operation of the Service Management Application

Figure 5:
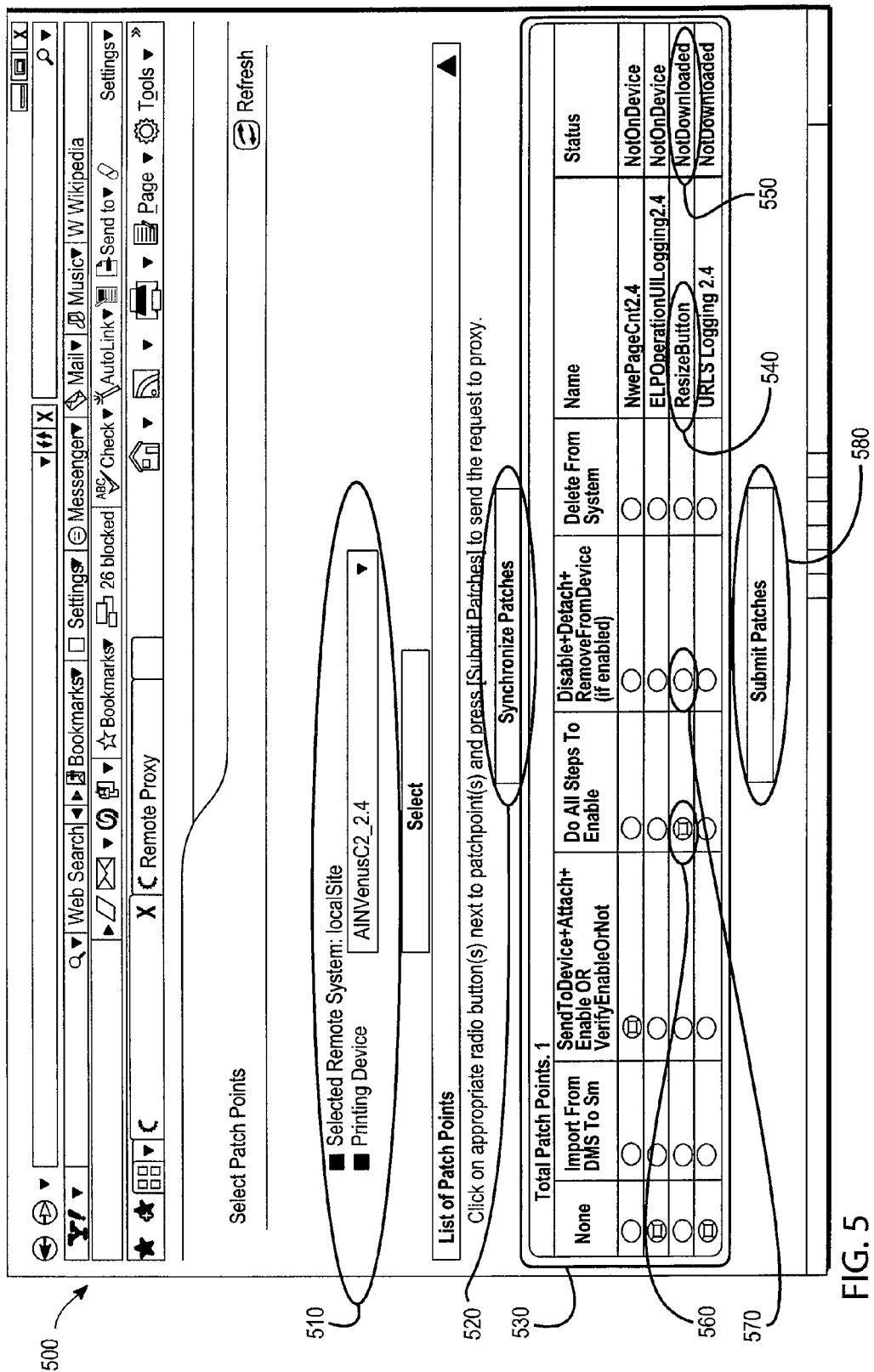
FIG. 5 depicts an administrator user interface in the form of a webpage.

Once initialized, typical operation of service management application 200 begins when the administrator accesses service management application 200 through administrator interface 310. FIG. 4 is a flow diagram the depicts example steps performed by the administrator during operation. A portion of a sample administrator interface is illustrated in FIG. 5 and described following the explanation of FIG. 4.

This illustration presupposes the administrator has already performed the proper initialization, described above and corresponding to step 440 of FIG. 4. The administrator selects a particular remote system for review through administrator interface 310. Information regarding the last received status of remote systems managed by service management application 200 can be accessed via DBMS 210. Information regarding the current status may be retrieved through status commands sent to device management application 250. This information is acquired in steps 410 and 430.

Any combination of steps 410, 420, 430 and 440 may be performed until the administrator has settled upon a remote system for which service management is desired, corresponding to step 450. In step 460, should the remote system have no available business office appliances for modification or review, the process is terminated at step 470.

Should the administrator select a remote system having available business office appliances in step 460, the administrator is presented with a complete listing of available business office appliances from which the administrator may view the last received status of a selected business office appliance, in step 480. In an embodiment, administrator interface 310 presents the status of all software patches relevant to the selected business office appliance.

In step 486, the administrator may configure commands to: (1) import software patches from DBMS 210 into service management application 200, (2) send one or more software patches from service management application 200 to one or more selected business office appliances, (3) activate one or more software patches residing at one or more selected business office appliances, (4) disable one or more software patches currently enabled at one or more selected business office appliances, and (5) delete one or more software patches currently residing at one or more selected business office appliances.

Alternatively or additionally, at step 490 the administrator may also query one or more selected business office appliances for current status information and/or log files via administrator interface 310. Upon activation of this command, an electronic mail message containing commands directing the business office appliance to send current status information and/or log files is dispatched by application server 320 for processing by proxy server 240.

In an embodiment, the administrator may also synchronize the set of software patches and other parameters from one or more selected business office appliances with the corresponding set indicated by DBMS 210. In this embodiment, a message from service management application 200 would request the status of all software patches and other parameters of the one or more selected business office appliances.

After the administrator has performed one or both of: (1) configuring all software patch commands followed by activation of the "submit" command at step 486, and (2) retrieving updated status information or log files for review followed by activation of the "submit" command at step 490, the data for generating a request document is fetched from DBMS 210 by database interface 330, the request document is generated to be sent in one or more electronic mail messages by communicator 340, and dispatched by application server 320 for processing by proxy server 240.

In one embodiment, a status of one or more office appliances is retrieved by communicating information about the office appliances in structured documents sent between the service management application and the device management application. In first network 221, a request document is generated that includes information that causes one or more status retrieval functions to be performed with respect to the one or more office appliances. Optionally, the information may be stored in XML format. For example, the information may include a tag such as "id" and a value that contains a device identifier, and a tag such as "patch" with a value that identifies a patch for which the status is inquired. In one embodiment, the request document is generated by service management application 200. In another embodiment, the request document is generated by an application particularly configured to generate request documents for office appliances.

The request document may be sent from first network 221 to a computing device behind a firewall on second network 222. For example, the request document may be sent in an email message addressed to an account associated with the device management application 250. In one embodiment, the request document is sent using SOAP calls to the device management application 250. In another embodiment, the request document is sent using another firewall friendly protocol.

In one embodiment, the request document is sent to a customer account on a mail server at first network 221 or second network 222. The computing device on second network 222 is configured to retrieve the request document from the mail server. In one example, the mail server may provide access via POP3, and the computing device includes a mail client to access the mail server via POP3.

In a particular embodiment, the request document may be encrypted as the request document is sent over intermediate network 220. For example, the request document may be encrypted using a shared key. The request document may also be transmitted using a secure firewall friendly protocol such as secure http or secure ftp.

FIG. 5 depicts a portion of an embodiment of administrator interface 310, presented to the administrator as a webpage 500. Selection area 510 displays information regarding a selected business office appliance as part of selected remote system (here for example, MFP 261, named "AINVenusC2__2.4" that is part of selected remote system named "localSite" in webpage 500), and allows re-selection, if desired.

Activation of synchronize button 520 effects synchronization between applicable software patches (referred to in webpage 500 as "patches" or "patch points") and other parameters on either DBMS 210 or the selected business office appliance.

Following synchronization, status area 530, displays status information regarding patch points and other parameters applicable to the selected business office appliance AINVenusC2__2.4. For example, patch name 540 refers to the "ResizeButton" patch having a current status 550 of "Not-Downloaded," indicating the ResizeButton patch currently resides in DBMS 210 and has not been downloaded to AINVenusC2__2.4.

The first six columns in status area 530 display radio button selections permitting the administrator to reconfigure the status of the patch points. Radio button selections are 'context aware,' meaning that for a given patch, the radio button selections available may depend on the current status of the patch, For example, button 560 is selected corresponding to the action "Do All Steps to Enable," which, following activation of submit button 580, would: (1) cause the transmission of the ResizeButton patch to device management application 250; (2) also cause the transmission of the ResizeButton patch to the selected business office appliance; (3) further cause the execution of the ResizeButton patch on the selected business office appliance; and (4) finally cause the return of status information of the ResizeButton patch on the selected business office appliance. However, in this example, the administrator may not be presented the option of activating radio button 570 corresponding to the action "Disable+Detach+RemoveFromDevice (if Enabled)" because the ResizeButton patch is not currently enabled or attached to the selected business office appliance.

The software patch deployment methods will now be described in more detail regarding operations occurring inside the firewall where the actual business office appliances are operating.

E. Operation of the Device Management Application

FIG. 6 depicts device management application 250 having converter interface 610 and device commands communicator 620. However, device management application 250 need not comprise a component separate from proxy server 240 as depicted in FIG. 2; the particular embodiment here is presented to illustrate the various functions device management application 250 can be expected to perform. In an embodiment, proxy server 240 operates using Apache Tomcat.

Electronic mail messages containing status requests and/or software patches to download, enable, or disable are fetched by proxy server 240 and converted, if necessary, by converter interface 610 into a format suitable for installation on each MFP. The status requests and/or software patches are then submitted to each business office appliance by device commands communicator 620. Commands to retrieve status or enable, disable, or download a software patch are performed on each business office appliance. In an embodiment, device commands communicator 620 includes remote debugging software. One example of remote debugging software is Field Diagnostics that permits access to selected portions of the memory of MFP 110. Techniques for modification of information resident on a business office appliance are further described in application Ser. No. 12/141,705, "Approach for Updating Usage Information on Printing Devices," filed on Jun. 18, 2008, which is assigned to the assignee of this application and incorporated by reference.

Converter interface 610 takes instructions encoded in the electronic mail message fetched by proxy server 240, and if necessary, converts the instructions into a format executable by the destination business office appliance. In an embodiment, such instructions modify the operation of the destination business office appliance; for example, the instructions could change the user interface on the MFP. Device commands communicator 620 then transfers these instructions during normal operation of the business office appliance, effecting the change without requiring re-boot of the business office appliance.

In an embodiment, the instructions encoded in the electronic mail message seek status data, such as log files or other information related to the status of one or more parameters or software patches, from the business office appliance. After device commands communicator 620 transfers these instructions to the business office appliance, device commands communicator 620 waits for transmission of the status data from the business office appliance. The received status data is converted by converter interface 610, if necessary, into a format suitable for transmission as an attachment to an electronic mail message, and forwarded to proxy server 240 as an electronic message for delivery to service management application 200 via intermediate network 220.

In one embodiment, a request document received from service management application 200 is processed by device management application 250. In a particular embodiment, a mail server on the first network or on the second network is periodically checked to determine whether one or more request documents have been submitted. In another embodiment, the request documents are sent from the first network to the second network using a firewall friendly protocol that does not require proxy server 240 to periodically check for new messages.

Device management application 250 uses information from the request document to identify one or more office appliances for which a status is requested. Optionally, device management application 250 identifies particular patches for which the status is requested. The device management application generates one or more instructions to retrieve the status from the one or more office appliances. In one embodiment, the instructions are embedded in the request document. In another embodiment, the instructions are constructed based on one or more parameters contained in the request document and other information available on device management application 250 or second network 222. In a particular embodiment, the one or more parameters from the request document are operators or variables used by one or more functions that are to be executed by the computing device that manages the one or more office appliances. In another particular embodiment, the one or more parameters are operators or variables used by one or more functions that are executed on the one or more office appliances.

The instructions are performed on the one or more office appliances, and a status is retrieved for each of the one or more office appliances. In one embodiment, the status retrieval instructions are included with instructions for updating one or more patches on the one or more office appliances. The status may be retrieved as the one or more office appliances are operating without interrupting the operation of the one or more office appliances. For example, the information may be retrieved from shared memory for the one or more office appliances.

In one embodiment, the request document contains information that instructs the computing device to activate one or more patches on the one or more office appliances. Based on the request document, the computing device instructs the one or more office appliances to install the one or more patches. If the patches are successfully installed as a result of the instruction, then a response document may be generated by the computing device to indicate that the patch was successfully activated on the one or more office appliances. If the patches are not successfully installed, then the response document may indicate that the patches were not installed. If the patches already existed on the office appliances prior to receiving the request document, then the request document may indicate that the patches are on the one or more office appliances but did not need to be activated or installed on the one or more office appliances.

A computing device on the second network such as device management application 250 generates a response document that is responsive to the request document. In one embodiment, device management application 250 waits until the status of each office appliance is received before constructing a response document. In another embodiment, device management application 250 waits until results are received in response to multiple request documents before generating a single response document.

In other embodiments, device management application 250 sends documents as information is received from the one or more office appliances, or periodically, whether or not the documents are responsive to any request documents. Documents that are generated in response to a change in status that is detected on one or more office appliances may be called alert documents. Alert documents may be generated by device management application 250 as the changes in status are detected, without receiving a request document. In one embodiment, a shared memory of the one or more office appliances are monitored by device management application 250, and changes to the shared memory are communicated in alert documents that are sent to service management application 200.

In yet another embodiment, device management application 250 periodically sends updates of status information to service management application 200, whether or not changes have occurred. For example, device management application 250 may update service management application 200 of all status information every five minutes.

The response document or alert document is sent from the computing device to the second network. The response document or alert document includes status information that reflects the result of performing the status retrieval instructions on the one or more office appliances. For example, the status of a particular patch on a particular office appliance may be "NotDownloaded," "NotOnDevice," or "Enabled." In the example, the "NotOnDevice" status indicates that the patch has been downloaded to the computing device on second network 222, but the patch has not yet been installed on the particular office appliance.

Other status information may indicate, for example, whether the office appliance is online, and, if so, whether it is busy or available. In another embodiment, status information is provided that quantifies the usage of the office appliance, such as number of sheets printed or number of days in service. In yet another embodiment, status information may indicate a physical orientation of the office appliance. For example, "TrayRemoved" or "PaperJam" may be conveyed as status information. In other embodiments, the status information may indicate network orientation and statistics such as which computers used or are using the office appliance. The techniques disclosed herein are not intended to be limited to any particular type of status information.

Figure 9:
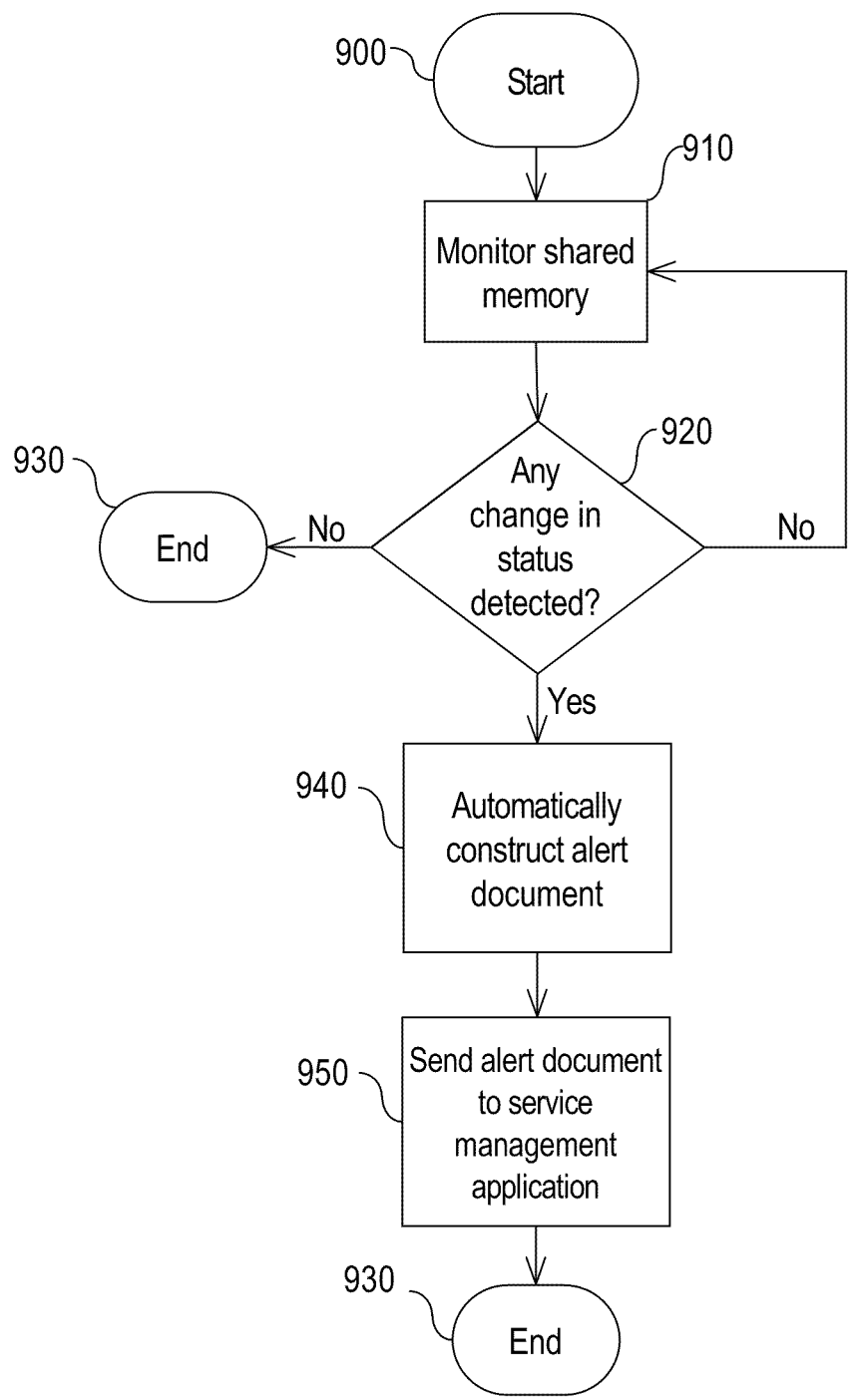
FIG. 9 is a flow diagram that depicts an approach for detecting a change in status on a business office appliance and updating a database on a service management system to reflect the change in status.

FIG. 9 depicts an approach for detecting a change in status on a business office appliance and updating a database on a service management system to reflect the change in status. Step 910 includes monitoring a shared memory that contains a status of one or more business office appliances. In step 920, a determination is made as to whether any changes in status are detected in shared memory. If no changes in status are detected, then the process continues at step 910 or ends at step 930. If changes in status are detected, then the process proceeds to step 940, where converter interface 610 of device management application 250 automatically constructs an alert document representing the detected changes to send to service management application 200. In step 950, device commands communicator 620 sends the alert document to service management application 200.

F. Results of Operation

Figure 7:
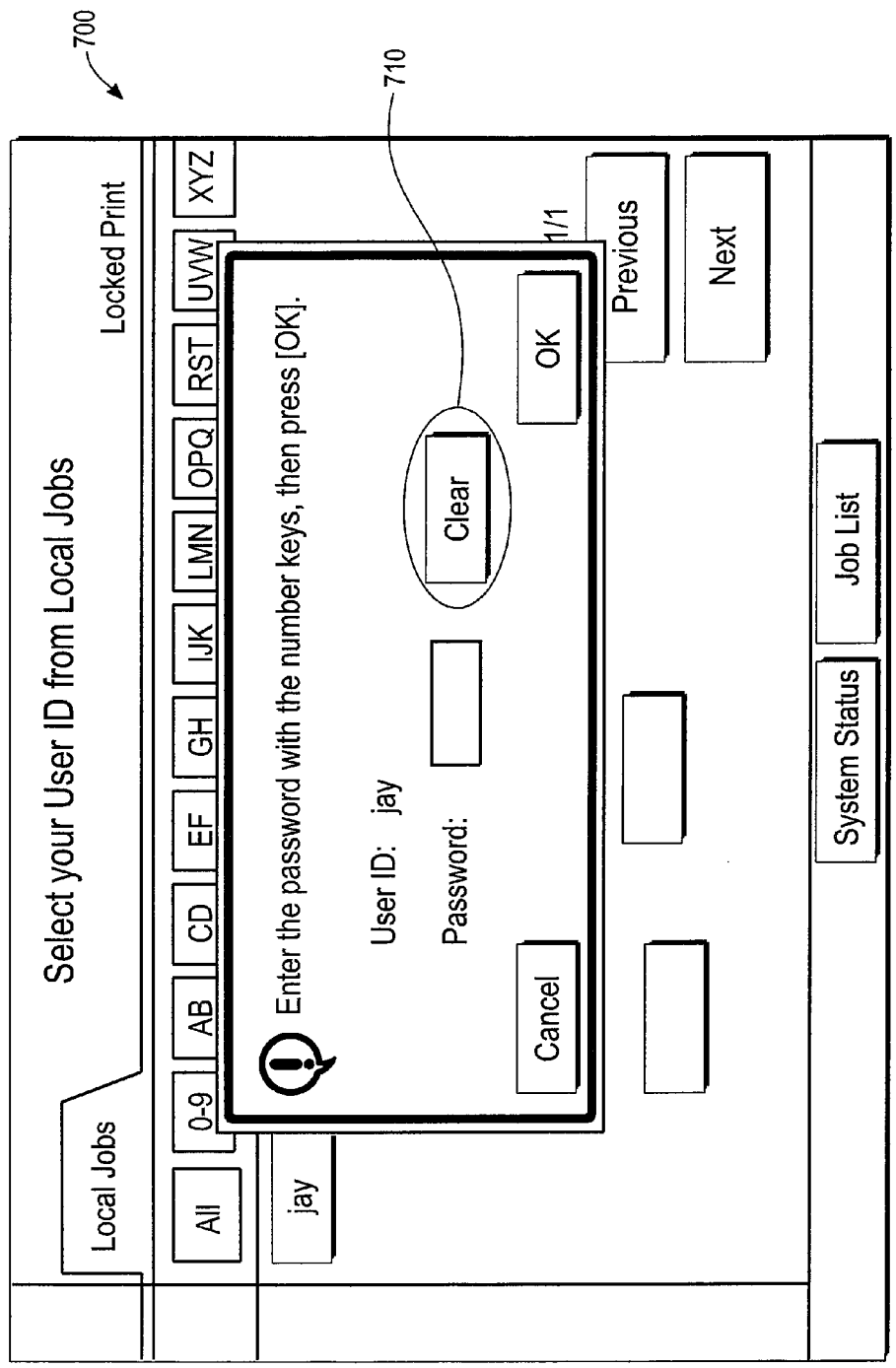
FIG. 7 depicts a user interface of an MFP prior to installation of a software patch.
Figure 8:
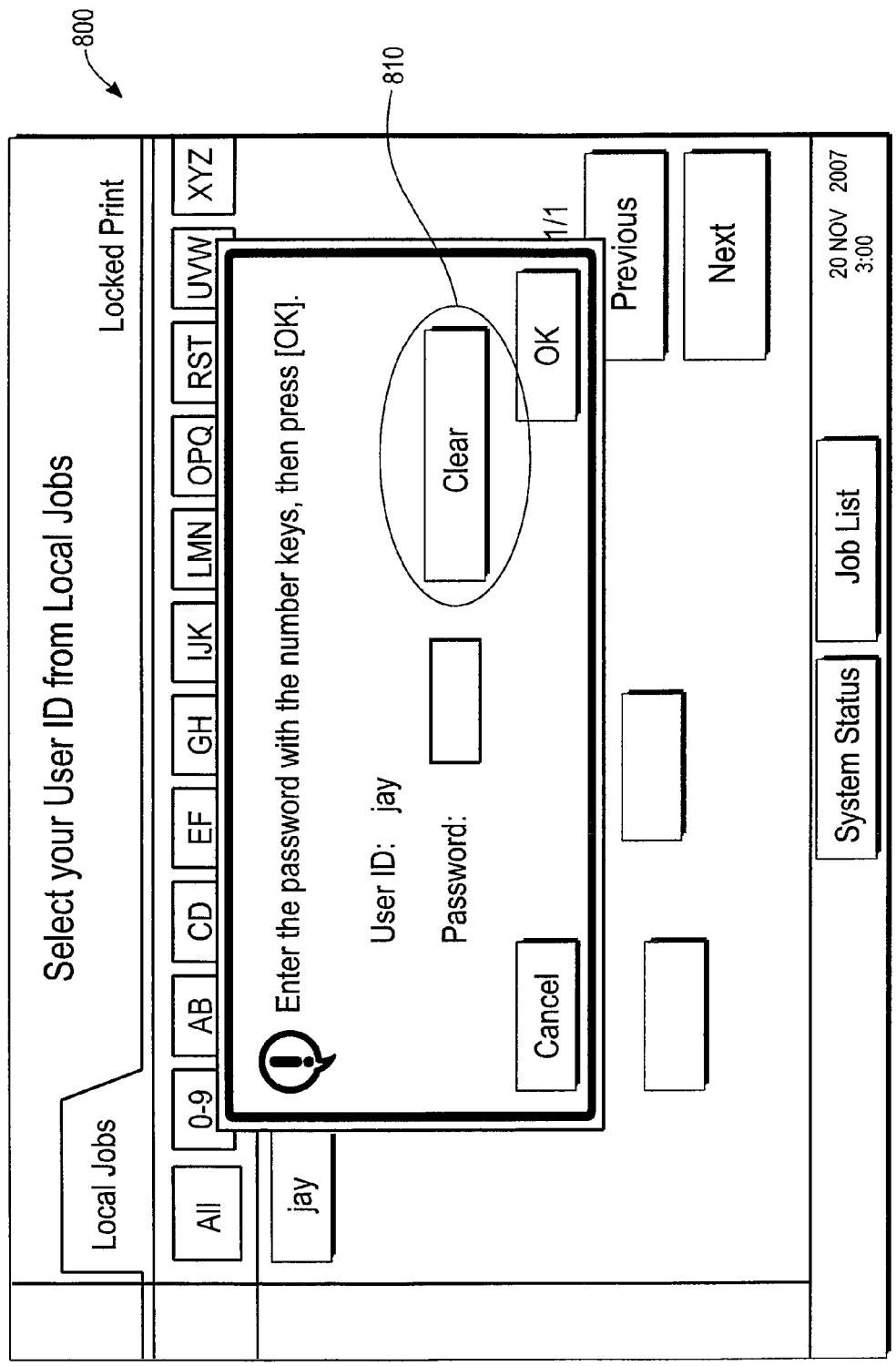
FIG. 8 depicts the user interface of the MFP after installation of the software patch.

Sample results of installing or updating a software patch are depicted in FIGS. 7-8. FIG. 7 depicts a user interface 700 displayed on an MFP operating in a network behind a firewall, prior to installation of a software patch. Clear button 710 appears in user interface 700 at a default size. With reference to FIG. 5, the administrator has configured webpage 500 as illustrated and is poised to activate submit button 580 and cause the ResizeButton patch to be enabled on the MFP currently displaying user interface 700 and clear button 710. In this example, the ResizeButton patch corresponds to software which when installed will enlarge the size of clear button 710 for added visibility and ease-of-use, such as to assist a sight-impaired user with use of the MFP.

Shortly after the administrator activates submit button 580, the ResizeButton patch is enabled on the MFP, with results depicted in FIG. 8. User interface 800 appears similar to user interface 700, with clear button 810 now noticeably larger in size. Thus the administrator, operating remotely from the other side of a firewall, was able to reconfigure an MFP without requiring either (1) a re-boot of the MFP, or (2) any manual intervention by users physically located at the site of the MFP. After reconfiguration commands have been executed on the MFP, the status of the ResizeButton patch on the MFP is updated to "Enabled." The updated status is returned for display to the administrator. This example is not intended to be limiting, as there are few, if any, limits on the software patches deliverable in this manner. In another example, the software patch could reconfigure a user interface to calculate and display copying costs based on the type and size of copying job to be performed by a user.

G. Computing Platforms

The approach described herein for managing usage information may be implemented on any type of computing platform or architecture. According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
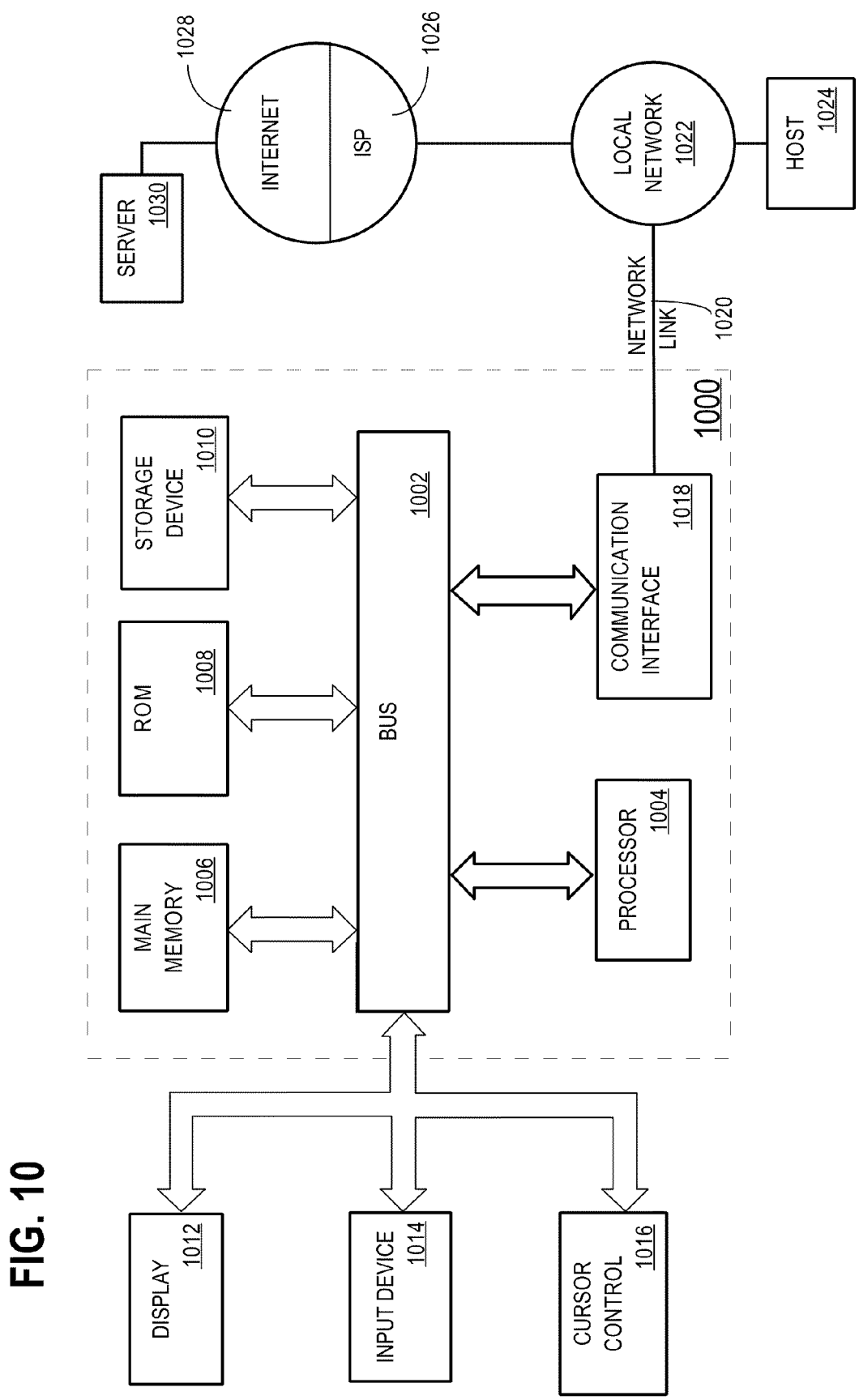
FIG. 10 is a block diagram of a computer system on which embodiments of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications. Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004. Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

generating, by one or more computing devices of a first network, a request message that includes information which, when processed by a device management application on a second network of one or more computing devices, causes one or more functions to be performed on one or more office appliances, wherein the one or more functions, when performed, updates a configuration state status of the one or more office appliances, wherein the information identifies the one or more office appliances;

sending, by the one or more computing devices of the first network using a message protocol that complies with a firewall on the second network, the request message from the first network to a computing device behind the firewall, wherein the one or more computing devices of the first network are prevented, by the firewall, from directly accessing the one or more office appliances on the second network; and receiving, from the computing device on the second network, a response message that is responsive to the request message and includes an updated configuration status that reflects a result of performing the one or more functions on the one or more office appliances.

2. The method of claim 1, wherein the causing the request message to be transmitted from the first network to the computing device on the second network comprises:

sending the request message to a customer account on a mail server on the first network;

wherein the computing device is configured to retrieve the request message from the mail server.

3. The method of claim 1, wherein the information in the request message includes one or more parameters for the one or more functions to be executed by one or more computing devices that manage the one or more office appliances.

4. The method of claim 1, wherein the information in the request message includes one or more parameters for the one or more functions to be executed on the one or more office appliances.

5. The method of claim 1, wherein the one or more functions activate one or more patches on the one or more office appliances, and wherein the result in the response message indicates one or more of:

the one or more patches were successfully activated on the one or more office appliances, the one or more patches were not activated on the one or more office appliances, and the one or more patches are on the one or more office appliances but did not need to be activated on the one or more office appliances.

6. The method of claim 1, wherein the sending the request message to the computing device is completed without modifying the firewall.

7. The method of claim 1, further comprising:
receiving, from the computing device on the second network, an alert message that is not responsive to a request message and includes the updated configuration status detected on one or more office appliances.

8. A non-transitory computer-readable storage medium storing instructions, wherein execution of the instructions by one or more processors causes:
generating, by one or more computing devices of a first network, a request message that includes information which, when processed by a device management application on a second network of one or more computing devices, causes one or more functions to be performed on one or more office appliances, wherein the one or more functions, when performed, updates a configuration status of the one or more office appliances, wherein the information identifies the one or more office appliances;
sending, by the one or more computing devices of the first network using a message protocol that complies with a firewall on the second network, the request message from the first network to a computing device behind the firewall, wherein the one or more computing devices of the first network are prevented, by the firewall, from directly accessing the one or more office appliances on the second network; and
receiving, from the computing device on the second network, a response message that is responsive to the request message and includes an updated configuration-state status that reflects a result of performing the one or more functions on the one or more office appliances.

9. The non-transitory computer-readable storage medium of claim 8, wherein the causing the request message to be transmitted from the first network to the computing device on the second network comprises: sending the request message to a customer account on a mail server on the first network; wherein the computing device is configured to retrieve the request message from the mail server.

10. The non-transitory computer-readable storage medium of claim 8, wherein the information in the request message includes one or more parameters for the one or more functions to be executed by one or more computing devices that manage the one or more office appliances.

11. The non-transitory computer-readable storage medium of claim 8, wherein the information in the request message includes one or more parameters for the one or more functions to be executed on the one or more office appliances.

12. The non-transitory computer-readable storage medium of claim 8, wherein the one or more functions activate one or more patches on the one or more office appliances, and wherein the result in the response message indicates one or more of: the one or more patches were successfully activated on the one or more office appliances, the one or more patches were not activated on the one or more office appliances, and the one or more patches are on the one or more office appliances but did not need to be activated on the one or more office appliances.

13. The non-transitory computer-readable storage medium of claim 8, wherein the sending the request message to the computing device is completed without modifying the firewall.

14. The non-transitory computer-readable storage medium of claim 8, further comprising: receiving, from the computing device on the second network, an alert message that is not responsive to a request message and includes the updated configuration status detected on one or more office appliances.

15. An apparatus comprising:
one or more processors;
wherein the apparatus is configured to execute one or more stored instructions by the one or more processors, causing the one or more processors to perform:
generating, by one or more computing devices of a first network, a request message that includes information which, when processed by a device management application on a second network of one or more computing devices, causes one or more functions to be performed on one or more office appliances, wherein the one or more functions, when performed, updates a configuration status of the one or more office appliances, wherein the information identifies the one or more office appliances;
sending, by the one or more computing devices of the first network using a message protocol that complies with a firewall on the second network, the request message from the first network to a computing device behind the firewall, wherein the one or more computing devices of the first network are prevented, by the firewall, from directly accessing the one or more office appliances on the second network; and
receiving, from the computing device on the second network, a response message that is responsive to the request message and includes an updated configuration status that reflects a result of performing the one or more functions on the one or more office appliances.

16. The apparatus of claim 15, wherein the causing the request message to be transmitted from the first network to the computing device on the second network comprises:
sending the request message to a customer account on a mail server on the first network;
wherein the computing device is configured to retrieve the request message from the mail server.

17. The apparatus of claim 15, wherein the information in the request message includes one or more parameters for the one or more functions to be executed by one or more computing devices that manage the one or more office appliances.

18. The apparatus of claim 15, wherein the information in the request message includes one or more parameters for the one or more functions to be executed on the one or more office appliances.

19. The apparatus of claim 15, wherein the one or more functions activate one or more patches on the one or more office appliances, and wherein the result in the response message indicates one or more of:
the one or more patches were successfully activated on the one or more office appliances,
the one or more patches were not activated on the one or more office appliances, and
the one or more patches are on the one or more office appliances but did not need to be activated on the one or more office appliances.

20. The apparatus of claim 15, wherein the sending the request message to the computing device is completed without modifying the firewall.

21. The method of claim 1, wherein the one or more functions activate one or more patches on the one or more office appliances, and wherein the result in the response message indicates whether or not the one or more patches are activated on the one or more office appliances.

22. The computer-readable storage medium of claim 8, wherein the one or more functions activate one or more patches on the one or more office appliances, and wherein the result in the response message indicates whether or not the one or more patches are activated on the one or more office appliances.

23. The apparatus of claim 15, wherein the one or more functions activate one or more patches on the one or more office appliances, and wherein the result in the response message indicates whether or not the one or more patches are activated on the one or more office appliances.

\* \* \* \* \*

UNITED STATES PATENT AND TRADEMARK OFFICE
CERTIFICATE OF CORRECTION

PATENT NO. : 8,719,811 B2
APPLICATION NO. : 12/495681
DATED : May 6, 2014
INVENTOR(S) : Revathi Vulugundam Page 1 of 1

It is certified that error appears in the above-identified patent and that said Letters Patent is hereby corrected as shown below:

In the Claims

Column 14:

Claim 1, line 23, delete "state"

Column 15:

Claim 8, line 30, delete "state"

Signed and Sealed this
Sixteenth Day of December, 2014

Michelle K. Lee
*Deputy Director of the United States Patent and Trademark Office*